(12) United States Patent
Hodde

(10) Patent No.: US 8,312,584 B2
(45) Date of Patent: *Nov. 20, 2012

(54) PIG RECEIVER ASSEMBLY

(75) Inventor: James R. Hodde, Houston, TX (US)

(73) Assignee: Power Associates International, Inc., Houston, TX (US)

(*) Notice: Subject to any disclaimer, the term of this patent is extended or adjusted under 35 U.S.C. 154(b) by 158 days.

This patent is subject to a terminal disclaimer.

(21) Appl. No.: 12/795,576

(22) Filed: Jun. 7, 2010

(65) Prior Publication Data

US 2011/0239386 A1  Oct. 6, 2011

Related U.S. Application Data

(63) Continuation-in-part of application No. 12/754,518, filed on Apr. 5, 2010.

(51) Int. Cl.
*B08B 9/04* (2006.01)
(52) U.S. Cl. ......... 15/3.51; 15/104.62; 137/268; 134/8
(58) Field of Classification Search ............ 15/3.51, 15/104.62; 137/268, 244, 15.07; 134/8
See application file for complete search history.

(56) References Cited

U.S. PATENT DOCUMENTS

| | | | | |
|---|---|---|---|---|
| 3,063,080 A | * | 11/1962 | Bergman et al. | 15/104.062 |
| 3,166,094 A | * | 1/1965 | Eagleton | 137/544 |
| 3,809,113 A | * | 5/1974 | Grove et al. | 137/268 |
| 2011/0240135 A1 | * | 10/2011 | Hodde | 137/15.01 |

* cited by examiner

*Primary Examiner* — Laura C Guidotti
(74) *Attorney, Agent, or Firm* — Tumey L.L.P.

(57) ABSTRACT

A pig receiver and method retrieve pigs in pipeline pigging operations. In one embodiment, a pig receiver includes a pig receiver unit. The pig receiver also includes a pig gate valve assembly disposed on the pig receiving unit. The pig gate valve assembly includes a gate valve. The pig gate valve assembly also includes a first actuator and a second actuator. The pig gate valve assembly further includes a cylinder guide. In addition, the pig gate valve assembly includes a tie bar. Actuation of the tie bar actuates the gate valve. An end of the tie bar is attached to the first actuator, and an opposing end of the tie bar is attached to the second actuator. The pig receiver also includes a pressure equalization system that adjusts the pressure downstream of the gate valve when the gate valve is in a closed position.

20 Claims, 3 Drawing Sheets

PIG RECEIVER ASSEMBLY

CROSS-REFERENCE TO RELATED APPLICATIONS

This application is a continuation-in-part application of U.S. application Ser. No. 12/754,518 filed on Apr. 5, 2010, which is herein incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of pipeline maintenance and more specifically to the field of using pipeline pigs for pipeline maintenance and new construction.

2. Background of the Invention

Pipeline pigs are conventionally used in the maintenance of pipelines. Pipeline pigs are typically inserted into a pig launcher. Pressure may then be added that pushes the pipeline pig along the pipeline until it reaches a pig receiver for removal from the pipeline. The pipeline pigs are commonly used to remove foreign material that may be in the line during construction of new pipelines. The pipeline pigs may also be used to make sure the pipeline has not become dented or wrinkled during bending or laying as well as also used to check for the ovalness of the pipeline. Further uses of the pipeline pigs may include removing water from pipelines after hydrostatic tests.

Drawbacks to conventional pig receivers include harm to the environment. For instance, matter removed from the pipelines may not be properly contained. Additional drawbacks to conventional pig receivers include downtime in launching new pipeline pigs when other pipeline pigs are being removed from the pipeline.

Consequently, there is a need for an improved pig receiver that allows pipeline pigs to be continually launched and received in pipelines. Further needs include improved pig receivers that facilitate environmental concerns.

BRIEF SUMMARY OF SOME OF THE PREFERRED EMBODIMENTS

These and other needs in the art are addressed in one embodiment by a pig receiver that includes a pig receiver unit. The pig receiver also includes a pig gate valve assembly disposed on the pig receiving unit. The pig gate valve assembly includes a gate valve. The pig gate valve assembly also includes a first actuator and a second actuator. The pig gate valve assembly further includes a cylinder guide. In addition, the pig gate valve assembly includes a tie bar. Actuation of the tie bar actuates the gate valve. An end of the tie bar is attached to the first actuator, and an opposing end of the tie bar is attached to the second actuator. The pig receiver also includes a pressure equalization system. The pressure equalization system adjusts the pressure downstream of the gate valve when the gate valve is in a closed position.

In addition, these and other needs in the art are addressed in an embodiment by a method for retrieving a pipeline pig. The method includes allowing the pipeline pig to run into a pig receiver. The pig receiver includes a pig receiver unit comprising a retrieval door. The pig receiver also includes a pig gate valve assembly disposed on the pig receiving unit. The pig gate valve assembly includes a gate valve. The gate valve is in an open position. In addition, the pig gate valve assembly includes a first actuator and a second actuator. The pig gate valve assembly also includes a cylinder guide. The pig gate valve assembly further includes a tie bar. Actuation of the tie bar actuates the gate valve. An end of the tie bar is attached to the first actuator, and an opposing end of the tie bar is attached to the second actuator. The pig receiver also includes a pressure equalization system. The pressure equalization system adjusts the pressure downstream of the gate valve when the gate valve is in a closed position. The method also includes actuating the pig gate valve assembly to move the gate valve to a closed position. In addition, the method includes opening the retrieval door. The method further includes retrieving the pig.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
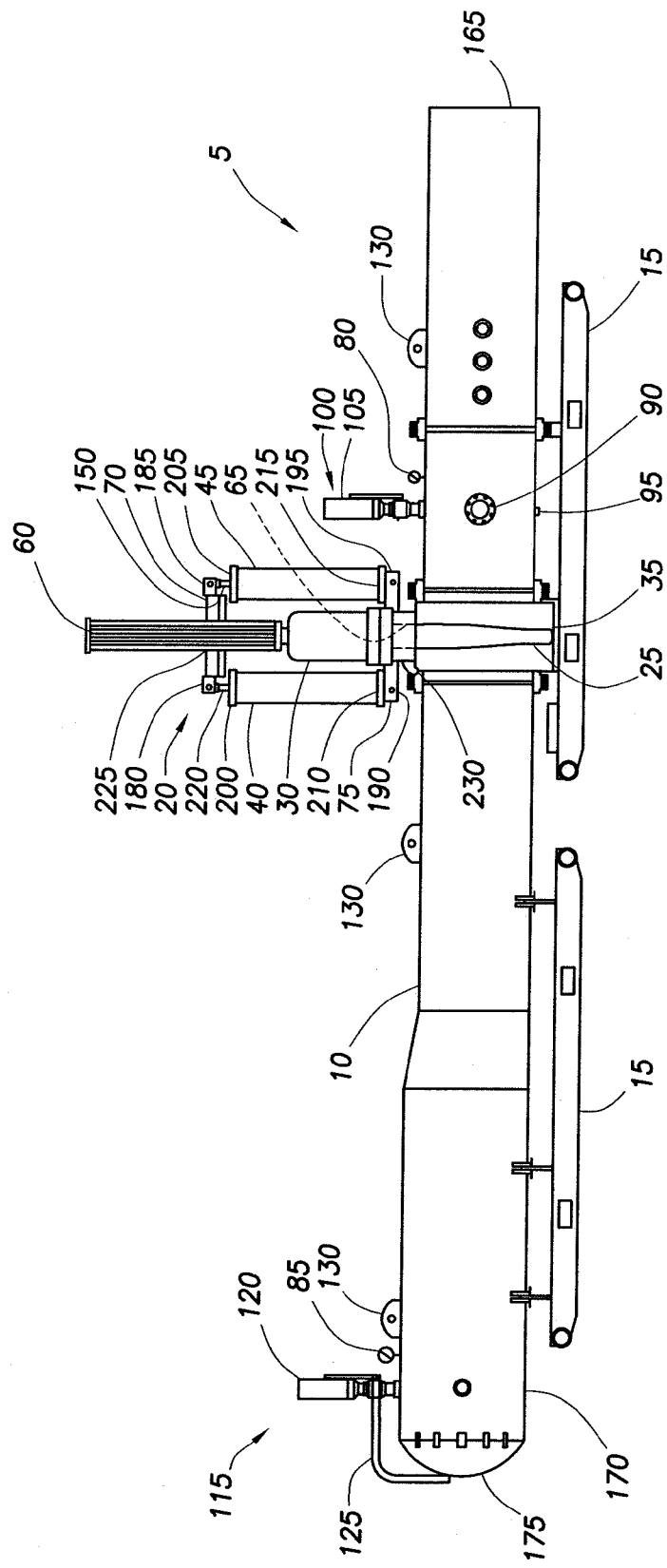
FIG. 1 illustrates a pig receiver, pig receiving unit, and pig gate valve assembly.

FIG. 1 illustrates pig receiver 5 having pig receiver unit 10, support 15, and pig gate valve assembly 20. Pig gate valve assembly 20 is secured to pig receiver unit 10 and allows pig receiver unit 10 to receive pigs (not illustrated) while additional pig or pigs may continue to progress through a pipeline (not illustrated). In an embodiment, pig receiver 5 is attached to the pipeline at pipeline contact end 165. The pigs enter pig receiver 5 at pipeline contact end 165. Pipeline contact end 165 may be attached to the pipeline by any suitable means.

Pig receiver unit 10 has any configuration suitable for facilitating passage of pigs therethrough. In an embodiment as illustrated in FIG. 1, pig receiver unit 10 has the typical configuration of a pipeline (e.g., substantially cylindrically shaped). In some embodiments as illustrated in FIG. 1, pig receiver unit 10 has an enlarged diameter on pig retrieval end 170, which is the end of pig receiver unit 10 longitudinally distal from pipeline contact end 165. Without being limited by theory, pig retrieval end 170 has an enlarged diameter because the enlarged diameter facilitates removing pigs from pig receiver unit 10. Pig receiver unit 10 has retrieval door 175. Retrieval door 175 is an openable and closeable door. In embodiments in which retrieval door 175 is open, pigs may be retrieved from pig receiver unit 10.

In some embodiments as illustrated in FIG. 1, pig receiver unit 10 also has take-off 90. In embodiments, take-off 90 allows for product or other material in pig receiver unit 10 to be removed. In an embodiment as illustrated in FIG. 1, take-off 90 is disposed on the surface of pig receiver unit 10 at a location between gate valve 25 and pipeline contact end 165. In some embodiments, pig receiver unit 10 has more than one take-off 90. In other embodiments as illustrated in FIG. 1, pig receiver unit 10 also has fastening means 130. Fastening means 130 include any means for fastening pig receiver 5 to a transportation means for transporting pig receiver 5 and/or for alignment of pig receiver 5 with a pipeline. In an embodiment as illustrated in FIG. 1, fastening means 130 is an eye fastener.

As shown in FIG. 1, pig gate valve assembly 20 includes gate valve 25, actuators 40 and 45, and cylinder guide 60. Gate valve 25 refers to an openable/closeable valve comprising a round, rectangular, or the like gate/wedge. Gate valve 25 includes gate valve seat 35. When gate valve 25 is in the closed position, gate valve seat 35 provides a seal that facilitates prevention of liquid leaking around gate valve 25. Gate valve 25 is attached to rod 65. In an embodiment as illustrated, gate valve 25 is attached to rod 65 on the longitudinal end of gate valve 25 distal to gate valve seat 35. Rod 65 is attached to tie bar 70. In an embodiment as illustrated, rod 65 is attached to tie bar 70 on the longitudinal end of rod 65 distal to gate valve 25. It is to be understood that rod 65 is shown in FIG. 1 by dashed lines for illustrated purposes only to show its location as rod 65 is not visible as shown from the side view of FIG. 1 (i.e., it is disposed within gate housing 30). Rod 65 and gate valve 25 are longitudinally moveable through the interior of gate housing 30. In an embodiment, gate housing 30 is secured to pig receiver unit 10. Gate housing 30 may be secured to pig receiver unit 10 by any suitable means. Cylinder guide 60 is secured to gate housing 30. Cylinder guide 60 extends longitudinally upward from gate housing 30. Pig gate valve assembly 20 also includes tie bar 70 and actuator support 75. Tie bar 70 and actuator support 75 are disposed on opposing ends of actuators 40, 45 from each other. Tie bar 70 has tie bar end 180 and tie bar end 185 on opposing longitudinal ends, and actuator support 75 has support end 190 and support end 195 on opposing longitudinal ends. Tie bar 70 is attached to both actuator 40 and actuator 45. Actuator 40 includes cylinder rod 220, and actuator 45 includes cylinder rod 150. In an embodiment, tie bar end 180 is attached to cylinder rod 220 at cylinder longitudinal end 200, and tie bar end 185 is attached to cylinder rod 150 at cylinder longitudinal end 205. In embodiments, tie bar ends 180, 185 may be attached to cylinder rods 220, 150, respectively, by any suitable means. Support ends 190, 195 may be secured to cylinder longitudinal ends 210, 215 by any suitable means. In an embodiment, cylinder longitudinal ends 210, 215 are disposed upon support ends 190, 195, with actuator support 75 providing physical support to actuators 40, 45. Tie bar 70 has tie bar opening 225 through which cylinder guide 60 may longitudinally pass therethrough. In an embodiment, actuator support 75 has support opening 230 through which a portion of gate housing 30 is disposed.

Figure 2:
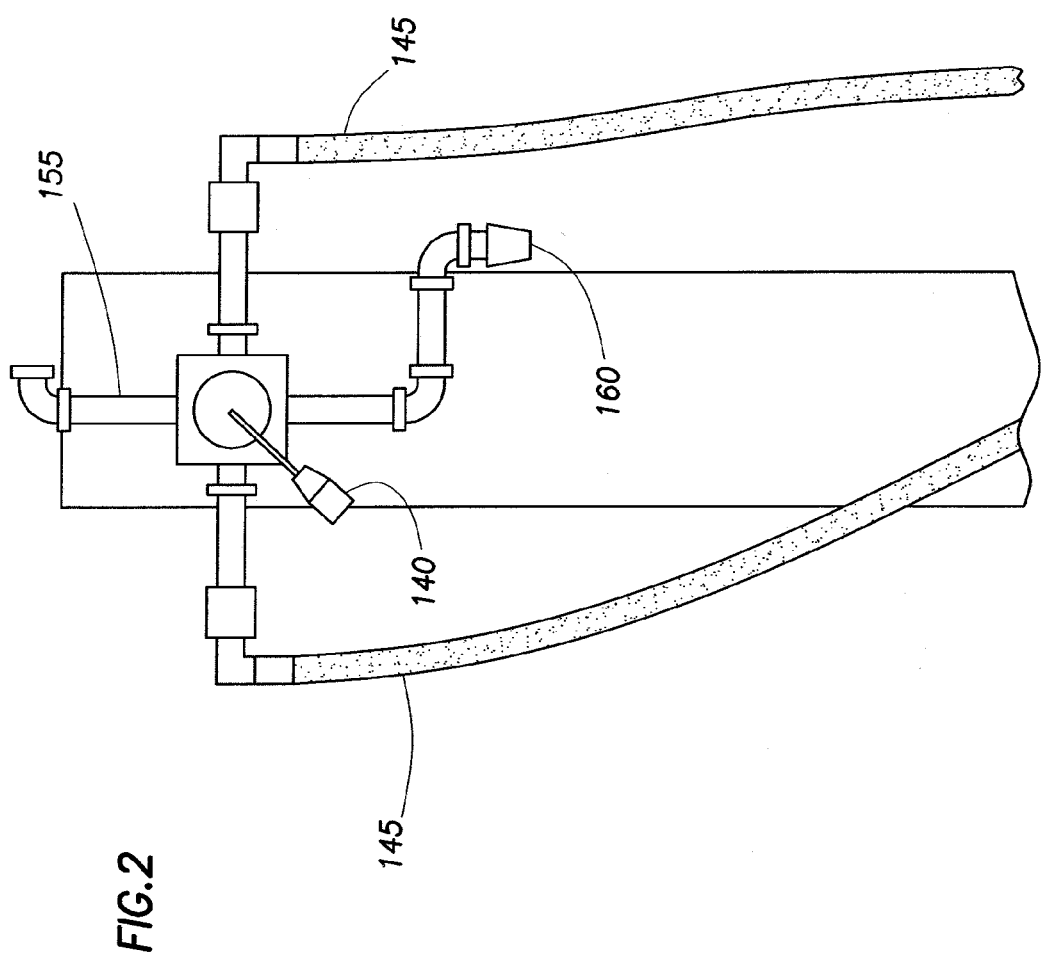
FIG. 2 illustrates an actuation system.

Actuators 40, 45 may include any suitable type of actuator for actuating opening and closing of gate valve 25. In embodiments, actuators 40, 45 are actuated by air and/or liquid (e.g., water). In embodiments, actuators 40, 45 are actuated by air. Actuators 40, 45 may have any suitable configuration for actuation of gate valve 25. In embodiments as illustrated in FIG. 1, actuators 40, 45 are cylindrical actuators. Actuators 40, 45 may be operated by any suitable means. FIG. 2 illustrates an embodiment of manual operation of actuators 40, 45.

In an embodiment as illustrated, actuation lever 140 is operated between open and closed positions. In embodiments, the open position actuates actuators 40, 45, and the closed position stops their action. The actuating air and/or liquid are supplied from inlet 155 to actuators 40, 45 via actuation lines 145. The return actuating air and/or liquid may be exhausted via outlet 160. Actuation lever 140 may be disposed at any suitable location on pig receiver 5. In an embodiment, actuation lever 140 is disposed on a side of pig receiver 5. Without limitation, embodiments with two actuators 40, 45 facilitate prevention of bending of rod 65. In an embodiment, actuation of actuators 40, 45 includes actuation of cylinder rods 150, 220 either in an upward or downward direction (i.e., in relation to pig receiver unit 10).

In embodiments, gate valve 25 is moveable between open and closed positions. To move gate valve 25 to an open position from the closed position shown in FIG. 1, actuation lever 140 is moved to the open position. The actuating air and/or liquid flows through actuation lines 145 to actuators 40, 45 thereby actuating actuators 40, 45 to move cylinder rods 150, 220 upwards. Upward movement of cylinder rods 150, 220 causes upward movement of rod 65 (via tie bar 70) and thereby rod 65 pulls gate valve 25 upward. Tie bar 70 moves upward along with cylinder rods 150, 220. The vertical movement of cylinder rods 150, 220 is guided by tie bar 70 having cylinder guide 60 pass therethrough. Cylinder guide 60 facilitates tie bar 70 moving in a substantially vertical direction. It is to be understood that cylinder guide 60 and gate housing 30 are not moving. Cylinder rods 150, 220 move upward until gate valve 25 is in an open position. To close gate valve 25, actuation lever 140 is moved to the closed position. Actuators 40, 45 then move cylinder rods 150, 220 downward with rod 65 pushing gate valve 25 downward into pig receiver unit 10 until gate valve 25 is in a closed position (i.e., substantially no fluid flows around gate valve 25). In an embodiment, the open position of gate valve 25 is in a fully open position with gate valve 25 not restricting any fluid flow within pig receiver unit 10.

In embodiments as shown in FIG. 1, pig receiver 5 also includes supports 15. Supports 15 may include any size and configuration suitable for supporting the weight of pig receiver unit 10. Pig receiver 5 is not limited to two supports 15 but in alternative embodiments may include one support 15 or more than two supports 15. In some embodiments, pig receiver unit 10 includes drain 95.

As illustrated in FIGS. 1 and 2, an embodiment of operation of pig receiver 5 includes pig receiver 5 attached to a pipeline (not illustrated). A pig (not illustrated) is progressing through the pipeline. At this instance, no pig is disposed within pig receiver 5. With the pig progressing through the pipeline, gate valve 25 is in the open position, and retrieval door 175 is closed. In some embodiments, pig receiver unit 10 has exhaust valves 100, 115. Exhaust valve 100 is disposed on pig receiver unit 10 between pig gate valve assembly 20 and pipeline contact end 165. In an embodiment, exhaust valve 100 is located proximate to pig gate valve assembly 20. Exhaust valve 115 is disposed between pig gate valve assembly 20 and pig retrieval end 170. In an embodiment, exhaust valve 115 is disposed proximate retrieval door 175. Exhaust valves 100, 115 may be any type of pressure relief valves suitable for exhausting pressure from pig receiver unit 10. In embodiments, exhausts valves 100, 115 are used to regulate and maintain a constant pressure in pig receiver unit 10. In some embodiments as illustrated, exhaust valves 100, 115 have exhaust silencers 105, 120, respectively. In embodiments as illustrated, a pressure gauge 80 measures the pressure of pig receiver unit 10 upstream of pig gate valve assembly 20. In an embodiment, pressure gauge 80 is disposed proximate exhaust valve 100. Additionally, in embodiments as illustrated, a pressure gauge 85 measures the pressure of pig receiver unit 10 downstream of pig gate valve assembly 20. In an embodiment, pressure gauge 85 is disposed proximate exhaust valve 115. When the pig passes pig gate valve assembly 20, the pig gate valve assembly 20 is actuated with actuators 40, 45 moving cylinder rods 150, 220 downward and pushing gate valve 25 into the closed position by cylinder rods 150, 220 pushing rod 65 downward. With gate valve 25 in the closed position, additional pigs may run in the pipeline. In embodiments, both exhausts valves 100, 115 remain open. In an embodiment, pressure gauge 85 is monitored, and if it shows a desired pressure, then retrieval door 175 is opened, and the pig is removed. In an embodiment as illustrated, exhaust valve 115 has lever 125. In an embodiment, lever 125 is disposed to provide an end of lever 125 sufficiently in front of retrieval door 175 to prevent opening of retrieval door 175 until the pressure in pig retrieval end 170 is at a desired pressure. When at a desired pressure, lever 125 is actuated (and the blocking end of lever 125 is no longer preventing opening of retrieval door 175), and retrieval door 175 is opened with the pig then being removed. With the pig removed, retrieval door 175 is closed, and pig gate valve assembly 20 is actuated to move gate valve 25 up to the open position. The next pig is then run through pig receiver 5, and the process may continue as desired.

Figure 3:
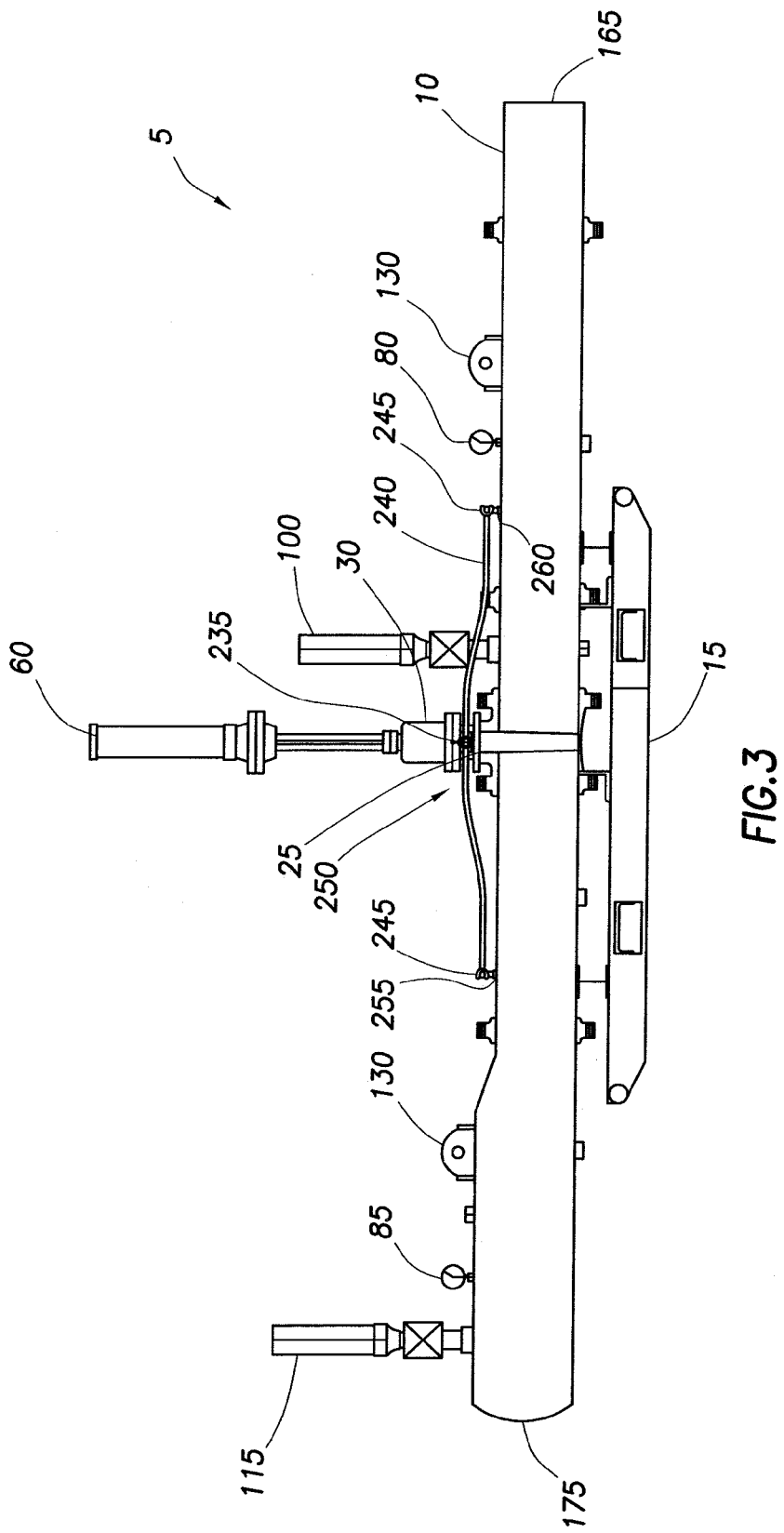
FIG. 3 illustrates a pig receiver having a pressure equalization system.

FIG. 3 illustrates an embodiment of pig receiver 5 having a pressure equalization system 250. Pressure equalization system 250 has pressure equalization valve 235 and pressure line 240. Pressure equalization system 250 facilitates adjusting the pressure in pig receiver unit 10 downstream of gate valve 25. Pressure line 240 is connected to pig receiver unit 10 on each side of gate valve 25 at downstream pressure connection 255 and upstream pressure connection 260, respectively. As illustrated, downstream pressure connection 255 is connected to pig receiver unit 10 downstream of gate valve 25 at a suitable location between gate valve 25 and retrieval door 175. In an embodiment, downstream pressure connection 255 is disposed at a suitable location between fastening means 130 and gate valve 25. Upstream pressure connection 260 is connected to pig receiver unit 10 upstream of gate valve 25 at a suitable location between gate valve 25 and pipeline contact end 165. In an embodiment, upstream pressure connection 260 is disposed at a suitable location between gate valve 25 and fastening means 130. Pressure line 240 may be any line suitable for use with a pipeline. Pressure equalization valve 235 controls the pressure flow through pressure line 240. Pressure equalization valve 235 may be any type of valve suitable for use with a pig receiver. For instance, in an embodiment, pressure equalization valve 235 is a ball valve. Pressure equalization valve 235 may be disposed at any suitable location on pressure line 240. In an embodiment, pressure equalization valve 235 is disposed about equidistant between downstream pressure connection 255 and upstream pressure connection 260. In embodiments, pressure equalization valve 235 is disposed proximate to gate valve 25. In some embodiments as illustrated, downstream pressure connection 255 and/or upstream pressure connection 260 have a muffler 245.

As illustrated in FIG. 3, an embodiment of operation of pressure equalization system 250 includes closing gate valve 25 or in which gate valve 25 is closed. In such an embodiment, pressure equalization valve 235 is in a closed position. In an embodiment, pressure equalization valve 235 is in a closed position when gate valve 25 is closed. In some embodiments, pressure equalization valve 235 is opened when gate valve 25 is in a closed position or when gate valve 25 is being closed. With gate valve 25 in a closed position and pressure equalization valve 235 open, the pressure downstream of gate valve 25 is adjusted via pressure line 240 by the pressure from upstream of gate valve 25. In an embodiment, the pressure downstream is adjusted to be about equal with the pressure upstream. In some embodiments, the pressure upstream and downstream of gate valve 25 is about equalized via pressure line 240.

It is to be understood that pig gate valve assembly 20 is not limited to two actuators (actuators 40, 45). In alternative embodiments (not illustrated), pig gate valve assembly 20 has one actuator. In other alternative embodiments (not illustrated), pig gate valve assembly 20 has more than two actuators.

It is to be further understood that tie bar 70 and cylinder guide 60 facilitate cylinder rods 150, 220 to move substantially parallel in relation to each other.

Although the present invention and its advantages have been described in detail, it should be understood that various changes, substitutions and alterations may be made herein without departing from the spirit and scope of the invention as defined by the appended claims.

What is claimed is:

1. A pig receiver, comprising:
    a pig receiver unit;
    a pig gate valve assembly disposed on the pig receiving unit, comprising:
        a gate valve;
        a first actuator and a second actuator;
        a cylinder guide;
        a tie bar, wherein actuation of the tie bar actuates the gate valve;
        wherein an end of the tie bar is attached to the first actuator and an opposing end of the tie bar is attached to the second actuator; and
    a pressure equalization system, wherein the pressure equalization system adjusts the pressure downstream of the gate valve when the gate valve is in a closed position.

2. The pig receiver of claim 1, wherein the pressure equalization system comprises a pressure equalization valve that is openable and closeable.

3. The pig receiver of claim 2, wherein the pressure equalization valve comprises a ball valve.

4. The pig receiver of claim 1, wherein the pressure equalization system comprises a pressure line.

5. The pig receiver of claim 1, wherein the first actuator and the second actuator are on opposing sides of the cylinder guide.

6. The pig receiver of claim 1, wherein the tie bar comprises a tie bar opening, wherein the cylinder guide is longitudinally passable through the tie bar opening.

7. The pig receiver of claim 1, further comprising an actuator support, wherein the actuator support is disposed on opposing longitudinal ends of the first actuator and the second actuator from the tie bar.

8. The pig receiver of claim 1, wherein the first actuator and the second actuator each comprise a cylinder rod, wherein the cylinder rods are moveable along a longitudinal length of the cylinder guide, and wherein movement of the cylinder rods move the gate valve.

9. The pig receiver of claim 1, wherein a rod attaches the gate valve to the tie bar.

10. A method for retrieving a pipeline pig, comprising:
    (A) allowing the pipeline pig to run into a pig receiver, wherein the pig receiver comprises:
        a pig receiver unit comprising a retrieval door; and a pig gate valve assembly disposed on the pig receiving unit, comprising:
   a gate valve, wherein the gate valve is in an open position;
   a first actuator and a second actuator;
   a cylinder guide;
   a tie bar, wherein actuation of the tie bar actuates the gate valve;
   wherein an end of the tie bar is attached to the first actuator and an opposing end of the tie bar is attached to the second actuator; and
   a pressure equalization system, wherein the pressure equalization system adjusts the pressure downstream of the gate valve when the gate valve is in a closed position;
(B) actuating the pig gate valve assembly to move the gate valve to a closed position;
(C) opening the retrieval door; and
(D) retrieving the pig.

11. The method of claim 10, wherein the pressure equalization system comprises a pressure equalization valve that is openable and closeable.

12. The method of claim 11, wherein the pressure equalization valve comprises a ball valve.

13. The method of claim 10, wherein the pressure equalization system comprises a pressure line.

14. The method of claim 10, further comprising:
(E) closing the retrieval door;
(F) actuating the pig gate valve assembly to move the gate valve to the open position; and
(G) allowing a second pig to run into the pig receiver.

15. The method of claim 10, wherein the pig receiver comprises a pig receiving end, and wherein the method further comprises measuring a pressure of the pig receiving end.

16. The method of claim 10, further comprising measuring a pressure of the pig receiver unit downstream of the pig gate valve assembly.

17. The method of claim 10, wherein the pig receiver comprises an exhaust valve disposed proximate the retrieval door, and wherein retrieving the pig comprises actuating a lever that is connected to the exhaust valve and that has an end disposed proximate the retrieval door when the lever is in a position.

18. The method of claim 17, wherein the exhaust valve is in an open position when the gate valve is in the closed position.

19. The method of claim 10, wherein actuating the pig gate valve assembly to move the gate valve to the closed position comprises moving the tie bar toward the pig receiving unit, wherein the tie bar moves in a direction along a longitudinal length of the cylinder guide.

20. The method of claim 10, wherein a rod attached to the tie bar pushes the gate valve to the closed position.

* * * * *